June 30, 1964

R. C. WHEAT 3,139,468

ALTERING DIMENSION OF VULCANIZED TRANS-POLYBUTADIENE
AND HEATING TO CAUSE SAME TO APPROACH ORIGINAL SHAPE

Filed June 20, 1960

INVENTOR.
R.C. WHEAT

BY Hudson and Young

ATTORNEYS

June 30, 1964  R. C. WHEAT  3,139,468
ALTERING DIMENSION OF VULCANIZED TRANS-POLYBUTADIENE
AND HEATING TO CAUSE SAME TO APPROACH ORIGINAL SHAPE
Filed June 20, 1960  2 Sheets-Sheet 2
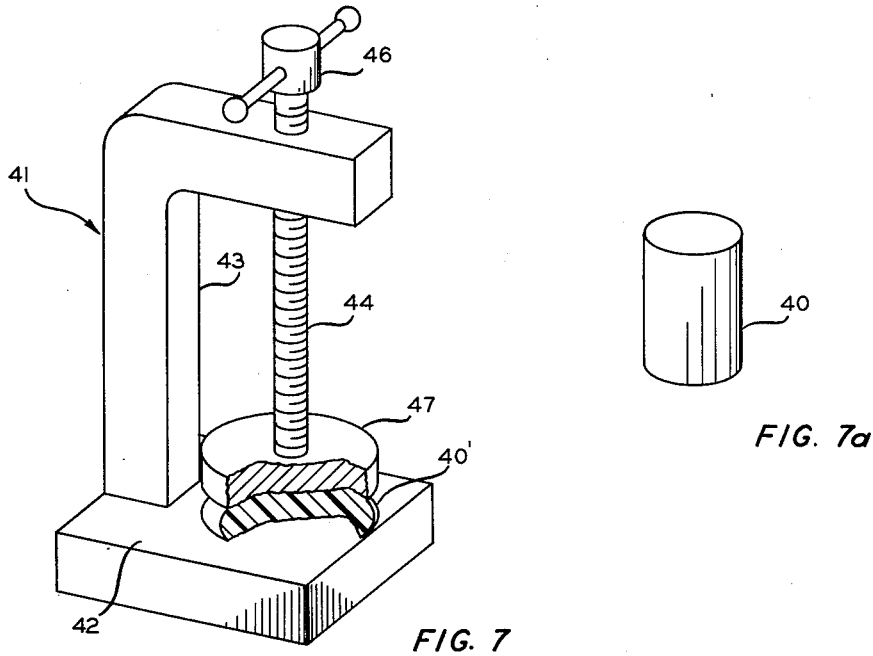
FIG. 7
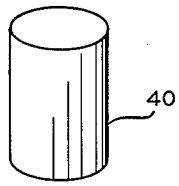
FIG. 7a
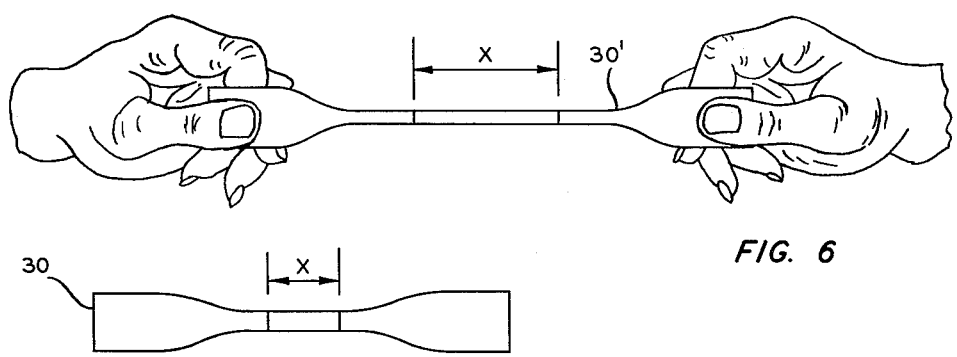
FIG. 6
FIG. 6a
INVENTOR.
R. C. WHEAT
BY Hudson & Young
ATTORNEYS United States Patent Office 3,139,468
Patented June 30, 1964

3,139,468
ALTERING DIMENSION OF VULCANIZED TRANS-POLYBUTADIENE AND HEATING TO CAUSE SAME TO APPROACH ORIGINAL SHAPE
Robert C. Wheat, Bartlesville, Okla., assignor to Phillips Petroleum Company, a corporation of Delaware
Filed June 20, 1960, Ser. No. 37,442
5 Claims. (Cl. 264—230)

This invention relates to a process comprising altering dimension of vulcanized trans-polybutadiene and heating to cause same to approach original shape.

In recent years, there has been a great deal of activity in the development of processes for producing olefin polymers. Polymers of monoolefins, such as ethylene and propylene, prepared by these processes have received wide acceptance by many industries. The more recent discovery in the field of diene polymerization of certain so-called stereospecific catalysts, which makes possible the formation of polymers having a certain configuration, has aroused considerable interest. The polymers formed by the use of these catalysts, particularly the butadiene and isoprene polymers, often have outstanding physical properties which render them equal to or even superior to natural rubbers. As a result, the synthetic rubbers are in many applications supplementing, or even replacing, natural rubbers. For example, trans 1,4-polybutadiene prepared with a stereospecific catalyst has been found to be an excellent substitute for gutta-percha in the manufacture of golf balls. The present invention is concerned with a process for treating trans 1,4-polybutadiene so as to obtain a novel product having unusual physical properties. These unusual properties render the product particularly suitable for use as a packaging or sealing material.

An object of the invention is to provide a process for treating trans 1,4-polybutadiene so as to obtain a polymer product which is heat-shrinkable or heat-expansible.

A further object of the invention is to provide a process for wrapping and sealing various types of articles.

Other and further objects of the invention will become apparent to those skilled in the art upon consideration of the accompanying description and the drawing, in which:

FIGURES 6 and 7 illustrate the process step which is carried out and shown in Examples I and II of the disclosure.

Figure 1:
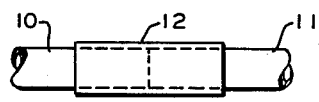
FIGURES 1 to 4 are schematic representations, illustrating several uses for the novel polymer composition of this invention.

The process employed in practicing the present invention includes the steps of vulcanizing a polybutadiene containing at least 75 percent trans 1,4-addition and then altering the shape of the vulcanized material either by stretching or by compressing the material. The polybutadiene which has been treated by the process of this invention upon being heated shrinks or expands depending upon whether the particular material was stretched or compressed.

The trans-polybutadiene used in practicing this invention contains at least 75 percent trans 1,4-addition, the remainder of the polymer being formed by cis 1,4-addition and 1,2-addition of the 1,3-butadiene. The polybutadiene in which about 75 to 95 percent of the polymer is formed by trans 1,4-addition of the butadiene is a particularly suitable polymer for use as a starting material. However, polybutadienes containing higher percentages of trans 1,4-addition, e.g., 99 percent and higher trans 1,4-addition, can also be used with advantage when practicing the present process. The polybutadienes generally have a Mooney Value (ML–4 at 230° F.) in the range of 5 to 175, preferably in the range of 20 to 50. A method which can be used to prepare polybutadienes containing at least 75 percent trans 1,4-addition is described by Zelinski and Smith in copending application Serial No. 579,429, filed on April 20, 1956, now Patent 3,050,513. According to the method of Belinski and Smith, a trans-polybutadiene can be prepared by polymerizing 1,3-butadiene with a catalyst composition comprising (a) a complex aluminum hydride of an alkali metal, such as lithium aluminum hydride, and (b) titanium tetraiodide. However, it is to be understood that the present invention is not limited to polybutadienes prepared by the Zelinski and Smith method since a polybutadiene prepared by any suitable method can be used as long as the polymer contains at least 75 percent trans 1,4-addition.

In practicing this invention, the trans-polybutadiene is first compounded in a suitable compounding recipe, which can be a gum stock recipe or a recipe containing reinforcing agents. Any of the standard recipes employed for compounding synthetic rubbers can be used although there will be some variation in physical properties because of variations in the types and amounts of the compounding ingredients. Except in the case of gum stock recipes, a compounding recipe generally includes a reinforcing agent or mineral filler, such as carbon black, silica, titanium, dioxide, zinc sulfide, calcium silicate, hydrated alumina or calcium carbonate. Although its presence is not mandatory, a plasticizer is usually included in the recipe. Examples of suitable plasticizers include aromatic hydrocarbons, such as aromatic extract oils; petroleum softeners including asphaltenes, saturated and unsaturated hydrocarbons, and nitrogen bases; rosin; mineral rubber; coumarone-indene resins; and esters such as dibutyl phthalate and tricresyl phosphate. The compounding recipe also includes curatives, such as a vulcanizing agent and an accelerator-activator. Examples of suitable vulcanizing agents are sulfur, a sulfur-liberating agent, such as thiuram disulfide, a thiuram polysulfide, or an alkyl-phenol sulfide, or a peroxide such as dicumyl peroxide or dibenzoyl peroxide. Suitable vulcanization accelerators include zinc diethyldithiocarbamate, N,N-dimethyl-S-tert-butylsulfenyldithiocarbamate, tetramethylthiuram disulfide, benzothiazyl disulfide, butyraldehyde-aniline, mercaptobenzothiazole, N-oxydiethylene-2-benzothiazyl sulfenamide and N-cyclohexyl-2-benzothiazolesulfenamide. Materials used in the recipe which function as an accelerator-activator include metallic oxides such as zinc oxide, magnesium oxide and litharge, or amines are used in addition to acidic materials such as fatty acids, for example, stearic acid. When sulfur is used as the vulcanizing agent, the amount should not exceed 5 parts by weight per 100 parts by weight of the trans-polybutadiene. The amount of sulfur which can be tolerated in the recipe is dependent upon the trans-content of the polymer. When the trans-content is high, more sulfur can be used than when the trans-content is lower. Too much sulfur in the compounding recipe, i.e., an amount in excess of 5 parts by weight per 100 parts by weight of the polymer, has been found to have an adverse effect upon the unique properties of the product of this invention.

After preparation of the compounded stock, it is then vulcanized, the vulcanization temperature generally being in the range of 280 to 400° F. The particular temperature used in the vulcanization will be dependent upon the type of curing system used, and it is to be understood that it is not intended to limit the invention to any particular vulcanization conditions. It is within the scope of the invention to effect the vulcanization at room temperature by using a sufficiently active curing system although such a procedure is ordinarily regarded as being impractical. Prior to the vulcanization step, the compounded stock is often formed into the shape of the article as it will be finally employed. For example, if it is desired that the article of manufacture be in the form of tubes or sheets, the compounded stock prior to vulcanization is then formed into tubes or sheets of such size and thickness as are required for the particular use.

After the compounded stock has been vulcanized, the resulting vulcanized stock is then subjected to a force which alters its original dimensions. If a heat-shrinkable product is desired, the vulcanized stock is stretched in one or both directions. There is actually no limit on the minimum amount of stretching to which the vulcanized stock can be subjected although it is usually preferred to stretch the material at least 50 percent of its original dimensions, in one or both directions, in order to obtain the maximum benefits of the heat-shrinkable property of the material. The vulcanized stock can be stretched as much as 300 percent of its original dimensions in each direction although it is usually preferred that the maximum amount of stretching be no greater than 200 percent in each direction. The stretching step can be carried out at room temperature or at elevated temperatures, e.g., between room temperature and up to 300° F. However, when operating at temperatures above room temperature, the vulcanized stock is permitted to cool while it is still under tension in order that the material will remain in the stretched condition. When the vulcanized and stretched composition is thereafter heated to an elevated temperature, for example, a temperature in the range of 120 to 300° F., the material contracts to substantially its original shape.

It is also within the scope of the invention to change the shape of the vulcanized stock by compressing the material. It is usually preferred to carry out the compression step with the vulcanized stock at an elevated temperature, e.g., at a temperature between room temperature and 300° F., in order that the stock will be soft and easy to compress. Thereafter, the compressed shape is allowed to cool. When the compressed vulcanized stock is thereafter heated, e.g., to a temperature in the range of 100 to 300° F., it will return to substantially its original shape. The amount that the vulcanized stock can be compressed in this manner will depend to a certain extent upon the shape of the object to be compressed. However, articles which are substantially cylindrical in shape can be compressed to 25 percent or less of their original height and then recover more than 90 percent of their original height upon being heated.

The vulcanized and stretched compositions of this invention are particularly useful as wrapping or sealing materials. Either before or after the stretching step, tubes of the vulcanized stock can be cut to form bands or sleeves, and sheets of the vulcanized stock can be cut into strips to form tape or into sheets of any desired dimension for the packaging material. After the vulcanized and stretched composition has been applied to the material to be wrapped or sealed, the assembly is subjected to an elevated temperature as hereinbefore described. This heating step causes the trans-polybutadiene composition to contract and form a tight covering around the object to which it has been applied. The temperature used in the shrinking step will be governed, at least in part, by the type of material to which the trans-polybutadiene composition is applied. Care must be taken to ensure that the object being covered or wrapped does not become distorted at the temperature used.

Figure 2:
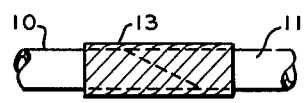

FIGURES 1 to 4 illustrate several applications for the vulcanized and stretched composition of this invention. In FIGURE 1 of the drawing, two lengths of plastic pipe 10 and 11 are shown as being positioned in horizontal alignment. A sleeve of the vulcanized, stretched composition of this invention is positioned over the ends of the two lengths of pipe. The temperature of the sleeve is then increased by the external application of heat or by passing hot water or steam through the pipes. This increase in the temperature of the sleeve causes the sleeve to shrink and provide a tight joint. If desired, the pipe lengths to be joined can be provided with flanged or beaded ends. If the trans-polybutadiene composition used in forming the sleeve has been stretched in both directions, an unusually tight joint results upon shrinkage of the sleeve. An alternative method for joining pipe or tubing is shown in FIGURE 2 of the drawing. According to this method, the lengths of pipe or tubing are wrapped with tape 13 formed of vulcanized and stretched polybutadiene. Upon being heated, the tape contracts, thereby forming a tight joint.

Figure 3:
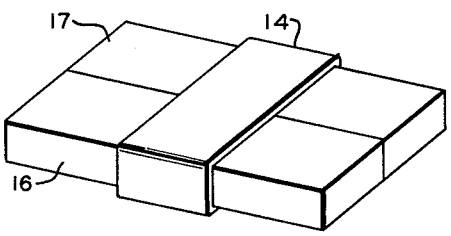
Figure 4:
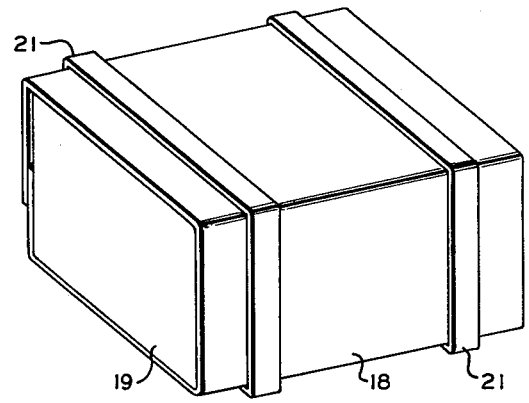

In FIGURE 3 of the drawing, a band 14 of vulcanized and stretched trans-polybutadiene is employed to hold two objects 16 and 17 in place. Upon exposure of the band to heat, the contacting surfaces of the two objects are pressed tightly against one another. In FIGURE 4, there is illustrated the use of a sheet 18 of the trans-polybutadiene composition as a packaging material covering object 19. The sheet is held firmly in place around the object by means of bands 21 which are formed of the same material. A very tight package or covering results when the entire assembly is subjected to the heating step.

Figure 5:
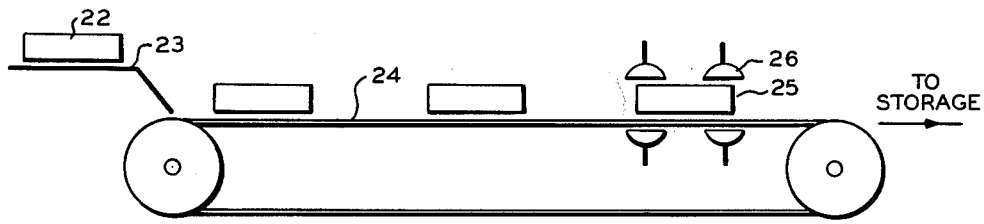
FIGURE 5 is a diagrammatic view of apparatus suitable for use in a packaging or wrapping operation.

In FIGURE 5 of the drawing, there is illustrated apparatus which can be used in packaging or wrapping various objects. As shown in the figure, the wrapping or banding of object 22 is accomplished on platform 23. Thereafter, the object wrapped with the stretched trans-polybutadiene composition of this invention is transferred to conveyor belt 24 which is continuously moved by any suitable mechanical means. The conveyor belt carries the wrapped material through heating zone 25 which is provided with suitable heating means such as heating lamps 26. Upon passing through the heating zone, the stretched trans-polybutadiene composition used as the wrapping material contracts forming a tight covering. Upon leaving the conveyor belt, the wrapped object is then transferred to suitable storage facilities.

The vulcanized and stretched trans-polybutadiene compositions of this invention have many other applications in addition to those already mentioned. In general, the compositions are particularly suitable where a tight wrapping is desirable, such as covers for chemical bottles, handlebar grips for bicycles and lawnmowers, covers for handles of various types of garden tools and the like. Seals for jars and bottles can also be provided by placing the stretched composition over the top of the jar or bottle and then heating.

The vulcanized and compressed trans-polybutadiene compositions of this invention can also be used in a variety of applications. In one important application, a compressed trans-polybutadiene is used to prepare a gasket which is to be subjected to elevated temperatures. As the temperature is increased, the gasket formed of the compressed material of this invention expands and fills any voids, thereby making a very tight seal. In another application, the vulcanized trans-polybutadiene is molded into a desired shape, e.g., in the shape of animals, figures or other toys. These shapes are then heated and compressed to a different shape from that of the original vulcanizate. When the compressed item is heated, e.g., in boiling water, it returns to the original shape of the vulcanized toy.

A more complete understanding of the invention can be obtained by referring to the following illustrative examples, which are not intended, however, to be unduly limitative of the invention.

EXAMPLE I

A series of runs was carried out in which 1,3-butadiene was polymerized with a catalyst consisting of lithium aluminium hydride ($LiAlH_4$) and titanium tetraiodide ($TiI_4$).

The procedure followed in each of the runs was to charge cyclohexane initially to the reactor. The cyclohexane which served as the diluent, had been dried by purging with dry nitrogen. Thereafter, the lithium aluminum hydride was added as a 2.4 weight percent solution in ether after which the titanium tetraiodide was charged. The titanium tetraiodide was introduced into the reactor as a 1 weight percent dispersion in cyclohexane. After the introduction of these materials, 1,3-butadiene, which had been dried by passing it through silica gel, was charged to the reactor. At the end of the polymerization period, water was added to stop the reaction, and the unreacted butadiene was removed under vacuum. The polymer solution was stabilized with phenyl-beta-naphthylamine dissolved in toluene at a level of 1.5 parts by weight per 100 parts of polymer. After washing the polymer with hot acid and with water, the trans-polybutadiene was flocced by steam stripping under vacuum for a period of 5 hours. The flocced polymer was dried in an extrusion dryer at a temperature of approximately 300° F. The extruded material was then water quenched after which surface moisture was removed in a tray dryer. The conditions under which the runs were conducted as well as certain properties of the products are presented hereinafter in Table I. It will be noted from this table that the polybutadienes contain from about 86 to 88 percent trans 1,4-addition.

Table I

| Run No | 1 | 2 | 3 | 4 | 5 |
| --- | --- | --- | --- | --- | --- |
| $LiAlH_4$, parts | 0.133 | 0.129 | 0.129 | 0.137 | 0.132 |
| $TiI_4$, parts | 2.28 | 2.22 | 2.22 | 2.35 | 2.26 |
| Polymerization temp., °F | 122-160 | 122-164 | 122-162 | 122-155 | 122-160 |
| Time, hours | 9.5 | 10.0 | 16.1 | 8.0 | 8.0 |
| Conversion, percent | 88 | 87 | 88 | 84 | 86 |
| ML-4 at 212° F.[1] | 32 | 41 | 30 | 29 | 25 |
| Inherent viscosity [2] | 1.79 | 1.94 | 1.69 | [4] 1.60 | |
| Microstructure, wt. percent:[3] | | | | | |
| cis | 10.6 | 9.4 | 9.6 | [4] 11.2 | |
| trans | 87.1 | 88.3 | 88.2 | [4] 86.5 | |
| Vinyl | 2.3 | 2.3 | 2.2 | [4] 2.3 | |

[1] ASTM D927-55T.
[2] One-tenth gram of polymer was placed in a wire cage made from 80 mesh screen and the cage was placed in 100 ml. of toluene contained in a wide-mouth, 4-ounce bottle. After standing at room temperature (approximately 25° C.) for 24 hours, the cage was removed and the solution was filtered through a sulfur absorption tube of grade C porosity to remove any solid particles present. The resulting solution was run through a Medalia-type viscometer supported in a 25° C. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample.
[3] Determined according to the method of Silas, Yates, and Thornton, Anal. Chem. 31, 529 (1959).
[4] Determined on blend from runs 4 and 5.

The products from the runs described hereinabove were blended on a roll mill at 230° F. Properties of the blend are shown hereinafter in Table II.

Table II

| | |
| --- | --- |
| ML-4 at 212° F.* | 25 |
| Inherent viscosity * | 1.62 |
| Gel, percent [1] | 0 |
| Resilience, percent [2] | 80.0 |
| Shore A Hardness, 80° F.[3] | 95 |

*See footnotes to Table I.
[1] Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth two-ounce bottle. A piece of folded ¼ inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e., the cage calibration. In the gel determination, after the cage containing the sample had stood for 24 hours in toluene, the cage was withdrawn from the bottle with the aid of forceps and placed in the two-ounce bottle. The same procedure was followed by determining the weight of swelled gel as was used for calibration of the cage. The weight of swelled gel was corrected by subtracting the cage calibration.
The cage, after removal from the two-ounce bottle, was placed in an aluminum weighing dish of known weight and the cage and dish were placed in a vacuum drying oven at 70-80° C. for one hour after which they were allowed to cool to room temperature and weighed. Subtracting the sum of the weights of the aluminum dish and the cage from the latter weighing gave the weight of the gel which was finally corrected for solution retention on the cage and for soluble polymer remaining within the gel structure.
[2] ASTM D945-55 (modified). Yerzley Oscillograph. Test specimen is a right circular cylinder 0.7 inch in diameter and 1 inch high.
[3] ASTM D676-55T. Shore Durometer, Type A.

The blend of trans-polybutadienes was compounded on a roll mill in accordance with the following recipe.

| | Parts by weight |
| --- | --- |
| trans-Polybutadiene | 100 |
| Philblack O [1] | 50 |
| Zinc oxide | 3 |
| Stearic acid | 2 |
| Flexamine [2] | 1 |
| Resin 731 [3] | 5 |
| Sulfur | 1.75 |
| NOBS Special [4] | 1.25 |

[1] High abrasion furnace black.
[2] Physical mixture containing 65 percent of a complex diarylamine-ketone reaction product and 35 percent of N,N'-diphenyl-p-phenylenediamine.
[3] A disproportionated pale rosin stable to heat and light.
[4] N-oxydiethylene-2-benzothiazylsulfenamide.

Certain physical properties of the compounded stock after curing for 30 minutes at 307° F. are shown hereinafter in Table III.

Table III

| | |
| --- | --- |
| Compression set, percent[1] | 0.0 |
| 300% modulus, p.s.i.[2] | 1820 |
| Tensile, p.s.i.[2] | 3525 |
| Elongation, percent [2] | 590 |
| Crescent tear, lbs./in.[3] | 530 |
| Δ T, °F.[4] | 74.3 |
| Resilience, percent* | 57.4 |
| Shore A Hardness, 80° F.* | 88 |

*See footnotes to Table II.
[1] ASTM D395-55, Method B (modified). Compression devices are used with 0.325 inch spacers to give a static compression for the ½ inch pellet of 35 percent. Test run for 2 hours at 212° F. plus relaxation for 1 hour at 212° F.
[2] ASTM D412-51T. Scott Tensile Machine L-6. Tests were made at 80° F.
[3] ASTM D624-54, Die A.
[4] ASTM D623-52T. Method A, Goodrich Flexometer, 143 lbs./sq. inch load, 0.175 inch stroke. Test specimen is a right circular cylinder 0.7 inch in diameter and 1 inch high.

The compounded stock was sheeted off the roll mill to a thickness of 0.08 inch. Slabs of 6" x 6" were cut from the sheet and cured for 20 minutes at 307° F. Dumbbell specimens were died from a cured slab and marked, the marks being exactly 1 inch apart. The strips were stretched by hand and treated as shown hereinafter in Table IV.

Table IV

| Sample No. | 1 | 2 | 3 | 4 | 5 |
|---|---|---|---|---|---|
| Original length, inches | 1.00 | 1.00 | 1.00 | 1.00 | 1.00 |
| Stretched length, inches | 2.15 | 2.13 | 2.23 | 2.07 | 2.05 |
| Length after heating 5 min.: | | | | | |
|   At 140° F | 1.22 | 1.20 | | | |
|   At 212° F | | | 1.03 | 1.03 | |
| Length after heating 1 min.: | | | | | |
|   At 324° F | | | | | 1.02 |

Subsequent to the first treatment, three of the test specimens (samples 3, 4 and 5) were again stretched at room temperature and allowed to rest for 16 hours at 80° F. They were then heated 5 minutes at 212° F. The results of this further treatment are shown in Table V.

Table V

| Sample No. | 3 | 4 | 5 |
|---|---|---|---|
| Original length, inches | 1.03 | 1.03 | 1.02 |
| Stretched length, inches | 2.07 | 2.20 | 2.10 |
| Length after standing 16 hours at 80° F., inches | 2.03 | 2.15 | 2.07 |
| Length after heating 5 minutes at 212° F. | 1.03 | 1.03 | 1.03 |

Two of the samples from the first treatment (samples 1 and 2) were again stretched and then heated for 5 hours at 140° F. The following results of these tests are shown in Table VI.

Table VI

| Sample No. | 1 | 2 |
|---|---|---|
| Original length, inches | 1.03 | 1.03 |
| Stretched length, inches | 2.38 | 2.48 |
| Length after heating 5 hours at 140° F | 1.12 | 1.18 |

The foregoing data show that the vulcanized trans-polybutadiene of this invention, after being stretched, returns to substantially its original dimensions upon being heated.

One sample of trans-polybutadiene was compounded as described above, formed into a tube approximately two inches in diameter, and vulcanized. A band of material was cut from the vulcanized stock and stretched about 225 percent of its original circumference. The stretched vulcanized stock was placed around a glass tube about 2¾ inches in diameter, and heated for 2 minutes at 212° F. The material contracted upon heating and formed a tight band around the glass tube.

EXAMPLE II

A portion of the blend of trans-polybutadiene as described hereinbefore was compounded in accordance with the following recipe:

| | Parts by weight |
|---|---|
| trans-Polybutadiene | 100 |
| Philblack O* | 50 |
| Zinc oxide | 3 |
| Stearic acid | 2 |
| Flexamine* | 1 |
| Sulfur | 1.75 |
| NOBS Special* | 1.25 |

*See footnotes to Recipe of Example I.

The compounded stock was cured for 30 minutes at 307° F. and certain physical properties were determined. The results of these determinations are shown hereinbelow in Table VII.

Table VII

| | |
|---|---|
| Compression set, percent [1] | 4.6 |
| 300% modulus, p.s.i.[1] | 1930 |
| Tensile, p.s.i.[1] | 3600 |
| Elongation, percent [1] | 545 |
| Δ T, °F.[2] | 76.0 |
| Resilience, percent [3] | 66 |
| Shore A Hardness [3] | 96 |

[1] See footnotes to Table III.
[2] Preheated 15 minutes at 100° F.
[3] See footnotes to Table II.

Hysteresis pellets (right circular cylinders 0.7 inch in diameter and 1 inch high) prepared from the compounded stock were compressed at 290° F. to approximately 25 percent of their original height. The pellets were then cooled in the compressed position, and allowed to rest for 1, 3, 7, 14, 28 and 84 days. They were then placed in a 310° F. oven for 30 minutes after which they were cooled and measured. The results are shown hereinafter in Table VIII.

Table VIII

| Percent of Original Height After Compression | Days Aged | Percent of Original Height After Aging and Before Heating | Percent of Original Height After Recovery |
|---|---|---|---|
| 25.5 | 1 | 25.7 | 93.2 |
| 26.3 | 3 | 27.6 | 95.8 |
| 25.7 | 7 | 26.0 | 93.0 |
| 25.7 | 14 | 26.3 | 92.9 |
| 25.8 | 28 | 26.0 | 93.5 |
| 25.4 | 84 | 25.7 | 91.6 |

From the foregoing, it is seen that there was no appreciable change in the height of the compressed pellets when conditioned up to 84 days at room temperature. Furthermore, the conditioning period had little, if any, effect upon the recovery of the pellets when subjected to heating. These data demonstrate that the vulcanized trans-polybutadiene of this invention, after being compressed, exhibits over 90 percent recovery upon being heated.

It will be apparent that many modifications and variations of the instant invention can be made by those skilled in the art. Such modifications and variations are believed to come within the spirit and scope of the foregoing disclosure.

I claim:

1. A process which comprises subjecting vulcanized polybutadiene which in its unvulcanized state contains at least 75 percent trans 1,4-addition to a force sufficient to alter its dimensions and thereafter heating the vulcanized polybutadiene to a temperature of at least 120° F., said heating causing said vulcanized polybutadiene to approach its original unaltered dimensions.

2. A process which comprises subjecting vulcanized polybutadiene which in its unvulcanized state contains at least 75 percent trans 1,4-addition to a force sufficient to alter its dimensions at a temperature between room temperature and 300° F., said force also being maintained for a time sufficient for said vulcanized polybutadiene to cool to room temperature, and thereafter heating the vulcanized polybutadiene to a temperature of at least 120° F., said heating causing said vulcanized polybutadiene to approach its original unaltered dimensions.

3. A process which comprises stretching vulcanized polybutadiene which in its unvulcanized state contains at least trans 1,4-addition and thereafter heating the stretched product to a temperature of 120° F. to 300° F., said heating causing said stretched product to shrink.

4. A process according to claim 3 in which said vulcanized polybutadiene is stretched to between 50 and 300 percent of its original dimensions.

5. A process which comprises compressing vulcanized polybutadiene which in its unvulcanized state contains at least trans 1,4-addition and thereafter heating the compressed product to a temperature of at least 120° F., said heating causing said compressed product to expand.

References Cited in the file of this patent

UNITED STATES PATENTS

| | | |
|---|---|---|
| 1,998,356 | Brown | Apr. 16, 1935 |
| 2,502,240 | Wiley | Mar. 28, 1950 |
| 2,533,609 | Nolan et al. | Dec. 12, 1950 |
| 2,821,155 | Seckel | Jan. 28, 1958 |
| 3,050,513 | Zelinski et al. | Aug. 21, 1962 |